US008462522B2

(12) United States Patent
Gruber et al.

(10) Patent No.: US 8,462,522 B2
(45) Date of Patent: Jun. 11, 2013

(54) DEVICE FOR CONNECTING A SINGLE-PHASE SUPPLY LINE TO A THREE-PHASE POWER SUPPLY SYSTEM

(75) Inventors: Rainer Gruber, Heilsbronn (DE); Ulrich Halfmann, Bräuningshof (DE); Wolfgang Recker, Möhrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 134 days.

(21) Appl. No.: 12/920,898

(22) PCT Filed: Feb. 13, 2009

(86) PCT No.: PCT/EP2009/051708
§ 371 (c)(1),
(2), (4) Date: Sep. 16, 2010

(87) PCT Pub. No.: WO2009/109453
PCT Pub. Date: Sep. 11, 2009

(65) Prior Publication Data
US 2011/0005879 A1    Jan. 13, 2011

(30) Foreign Application Priority Data
Mar. 3, 2008 (DE) .......................... 10 2008 012 325

(51) Int. Cl.
*H02M 5/45* (2006.01)
*B60L 1/00* (2006.01)

(52) U.S. Cl.
USPC ................................................ 363/36; 191/7

(58) Field of Classification Search
USPC ................... 323/361; 363/34, 36, 35, 37, 65, 363/70, 71; 191/4–7, 11; 230/14.05, 14.2
See application file for complete search history.

(56) References Cited

U.S. PATENT DOCUMENTS 4,689,735 A * 8/1987 Young ............................ 363/155
5,109,327 A * 4/1992 Griffin ............................. 363/36

(Continued)

FOREIGN PATENT DOCUMENTS

AU         639916 B2     8/1993
CN      101183792 A  *  5/2008

(Continued)

OTHER PUBLICATIONS

Zhuo et al, "Study of Novel Traction Substation Hybrid Power Quality Compensator", 2002 IEEE, pp. 480-484.

(Continued)

*Primary Examiner* — Adolf Berhane
*Assistant Examiner* — Jeffrey Gblende
(74) *Attorney, Agent, or Firm* — Laurence A. Greenberg; Werner H. Stemer; Ralph E. Locher

(57) ABSTRACT

A device for connecting at least one single-phase power supply line which, in particular, feeds the overhead line of a railroad track, to a three-phase power supply network. A primary side of a transformer is connected to the power supply network and a secondary side is connected to the single-phase power supply line and to a ground connection. A symmetry device is connected to a phase of the transformer, to the ground connection, and to the single-phase power supply line.

11 Claims, 2 Drawing Sheets

U.S. PATENT DOCUMENTS

| | | | |
|---|---|---|---|
| 5,280,418 A * | 1/1994 | Griffin | 363/34 |
| 2006/0082354 A1 * | 4/2006 | Haugs et al. | 323/356 |
| 2008/0158921 A1 * | 7/2008 | Stefanutti et al. | 363/67 |

FOREIGN PATENT DOCUMENTS

| | | |
|---|---|---|
| DE | 19828404 C1 * | 1/2000 |
| GB | 2170623 A | 8/1986 |
| GB | 2247576 A | 3/1992 |
| JP | 7257238 A | 10/1995 |
| JP | 9136560 A | 5/1997 |
| SU | 1346461 A2 | 10/1987 |
| SU | 1728056 A1 | 4/1992 |

OTHER PUBLICATIONS

Senini et al, "Novel Topology for Correction of Unbalanced Load in Single Phase Electric Traction Systems" Central Queensland University, Queensland, Australia, 2002 IEEE, pp. 1208-1212.

* cited by examiner

DEVICE FOR CONNECTING A SINGLE-PHASE SUPPLY LINE TO A THREE-PHASE POWER SUPPLY SYSTEM

BACKGROUND OF THE INVENTION

Field of the Invention

The invention relates to a device for connecting at least one single-phase supply line, which in particular feeds the overhead line of a railroad track, to a three-phase power supply system, wherein at least one transformer is connected from the primary side to the power supply system and on the secondary side to the at least one single-phase supply line and to a ground point or a return line.

"Single-phase supply line" can represent a so-called autotransformer system.

A three-phase, polyphase power supply system is available for supplying a load. Single-phase supply lines frequently have to be connected to this three-phase, power supply system, for example feeding the overhead line of a railroad track. When electrical power is transferred from the three-phase, polyphase power supply system to one or more single-phase supply lines, considerable unbalances occur in the polyphase power supply system. These lead to undesirable currents, and to undesirable voltages as well.

A device for connecting single-phase supply lines to a three-phase power supply system, by means of which such unbalances are intended to be reduced or even avoided, is described in 198 28 404 C1. The so-called V-circuit mentioned there always requires two transformer winding pairs, which supply two track sections, which are electrically isolated from one another, via separate single-phase supply lines. In order to largely avoid unbalances, this circuit also requires an additional phase isolation point. Additional inductive and capacitive loads are provided in order to further reduce the unbalances.

BRIEF SUMMARY OF THE INVENTION

The invention is based on the object of specifying a device for connecting at least one single-phase supply line to a three-phase power supply system, which requires as few phase isolation points as possible, in particular even having no phase isolation point, in order to achieve the desired reduction in the unbalances.

According to the invention, the object is achieved in that a balancing device is connected to the at least one single-phase supply line and to the ground point.

A return line can be used as the ground point.

The use of this specific balancing device for the first time makes it possible in a simple and cost-effective manner to overcome unbalances which occur when electrical power is being transferred from the three-phase polyphase power supply system to one or more single-phase supply lines, to be precise independently of the state of the at least one single-phase supply line. Undesirable currents in the three-phase power supply system are in this case compensated for on the secondary side.

By way of example, the balancing device is a converter. By way of example, this converter is a three-phase, self-commutated voltage intermediate-circuit converter.

It has been found that converters such as these can be used particularly advantageously as a balancing device. The balancing device advantageously applies current components to the single-phase supply lines, in order to correct the unbalances.

This results in the particular advantage that only standardized components are required. Even existing facilities can be retrofitted quickly and reliably.

For example, the balancing device has an associated inductive load and an associated capacitive load on the input side. This allows unbalances to be corrected even more cost-effectively.

By way of example, the balancing device has three phases, the inductive load is connected between the second and the third phase, and the capacitive load is connected between the first and the third phase of the balancing device. This results in optimum utilization.

By way of example, there is only one single-phase supply line and in that there is only one single transformer, which has three phases, and in that the first of three output phases of the transformer is connected to the single-phase supply line, the second of the three phases of the transformer is connected to the first phase of the balancing device, which has three phases, and the third of the three output phases of the transformer is connected to the ground point, and in that the second phase of the balancing device is connected to the single-phase supply line, and the third phase of the balancing device is connected to the ground point.

This circuit achieves the particular advantage that there is no longer any need for a phase isolation point. Furthermore, only a single transformer is required. Unbalances are corrected by the chosen connection of the balancing device.

According to another example, two single-phase supply lines, which are isolated by an isolation point, are provided, and in that the first phase of the balancing device, which has three phases, is connected to the first single-phase supply line, the second phase of the balancing device is connected to the second single-phase supply line, and the third phase of the balancing device is connected to the ground point.

This results in the advantage that only one balancing device is required in order to supply two isolated single-phase supply lines, while avoiding unbalances.

Against the background of this circuit for two single-phase supply lines which are isolated by an isolation point, a first example provides that a transformer, which has three phases, is provided, and in that the first of three output phases of the transformer is connected to the first single-phase supply line, the second of the three output phases of the transformer is connected to the second single-phase supply line, and the third of the three output phases of the transformer is connected to the ground point.

By way of example, only a single transformer is provided, and has three phases.

This results in the advantage that only one transformer is required in order to supply two isolated single-phase supply lines.

By way of example, at least two transformers are provided, which each have three phases and are connected in parallel. The availability and/or power are/is therefore increased.

A three-phase transformer may be a transformer with secondary voltages offset through 90°, or a Scott transformer.

A second example provides that two transformers are provided, which each have two phases, and in that the first of two output phases of the first transformer is connected to the first single-phase supply line and the first of two output phases of the second transformer is connected to the second single-phase supply line, and in that the second of two output phases of each transformer is connected to the ground point. The balancing device can therefore also be used advantageously together with two-phase transformers.

By way of example, at least one further two-phase transformer is connected in parallel with one or the other of the two two-phase transformers or with in each case both two-phase transformers.

In particular, the device according to the invention achieves the advantage that unbalances in the supply of single-phase supply lines from a three-phase polyphase power supply system can be reliably reduced, or even corrected, by simple means. Existing facilities can also be retrofitted. The device is particularly suitable for supplying power to the overhead line of a railroad.

Exemplary embodiments of the device for connecting a single-phase supply line to a three-phase power supply system according to the invention will be explained in more detail with reference to the drawing, in which:

DESCRIPTION OF THE INVENTION

In the figures, the same reference signs denote the same components.

Figure 1:
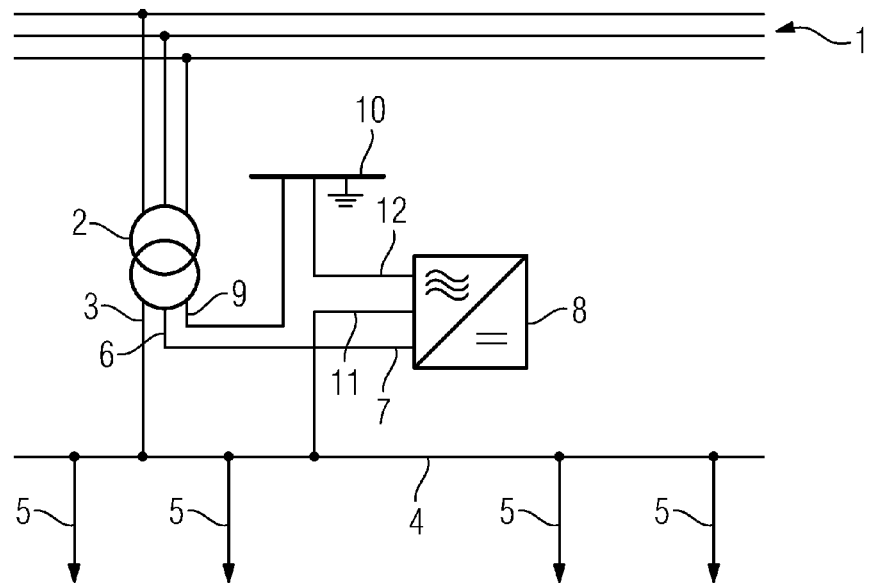
FIG. 1 shows a device having only one single-phase supply line, without an isolation point and with a three-phase transformer.

In FIG. 1, a three-phase transformer 2 is connected on the primary side to a three-phase power supply system 1. The first output phase 3 of the transformer 2 is connected to a single-phase supply line 4. Supply lines 5, which feed the overhead line of a railroad track, originate from this single-phase supply line 4. The second output phase 6 of the transformer 2 is connected to the first phase 7 of a balancing device 8, which has three phases. The third output phase 9 of the transformer 2 is connected to a ground point 10. The second phase 11 of the balancing device 8 is connected to the single-phase supply line 4, and the third phase 12 of the balancing device 8 is connected to the ground point 10. This circuit prevents undesirable unbalances in a simple manner.

Figure 2:
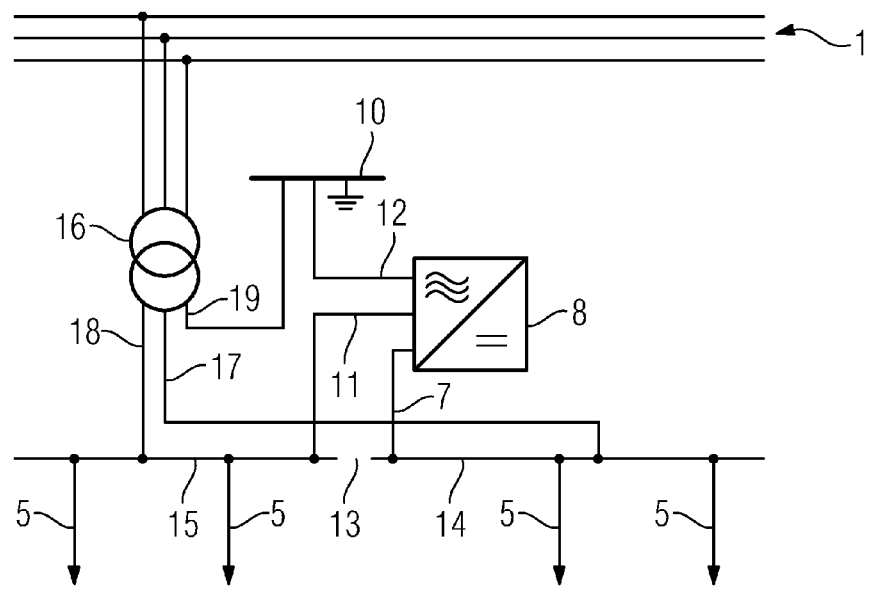
FIG. 2 shows a device with two single-phase supply lines, which are isolated by an isolation point, and with only one three-phase transformer.
Figure 3:
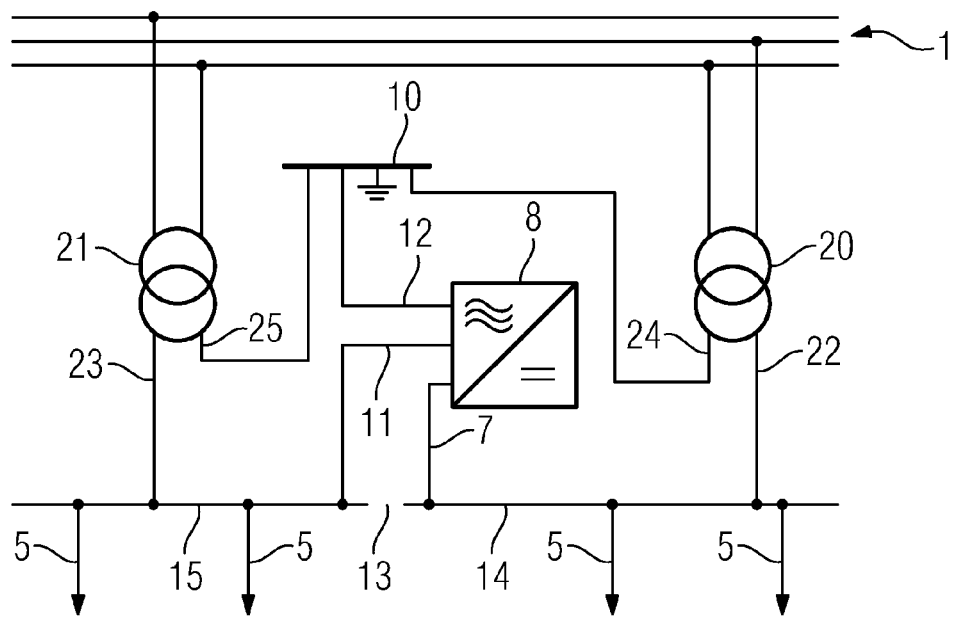
FIG. 3 shows a device with two single-phase supply lines, which are isolated by an isolation point, and with two two-phase transformers.

In FIGS. 2 and 3, two single-phase supply lines 14, 15 are provided, isolated by an isolation point 13. The first phase 7 of the balancing device 8, which has three phases, is connected to the first single-phase supply line 14, and the second phase 11 of the balancing device 8 is connected to the second single-phase supply line 15. The third phase 12 of the balancing device 8 is connected to the ground point 10.

In FIG. 2, the primary side of a single three-phase transformer 16 is connected to the three-phase power supply system 1. The first output phase 17 of the transformer 16 is connected to the first single-phase supply line 14. The second output phase 18 of the transformer 16 is connected to the second single-phase supply line 15. The third output phase 19 of the transformer 16 is connected to the ground point 10. One or more identical transformers can be connected in parallel with the transformer 16.

In FIG. 3, there are two two-phase transformers 20 and 21. The primary side of the first two-phase transformer 20 is connected to the second and third phases of the three-phase power supply system 1, and the primary side of the second two-phase transformer 21 is connected to the first and third phases of the three-phase power supply system 1. The first output phase 22 of the first two-phase transformer 20 is connected to the first single-phase supply line 14. The first output phase 23 of the second two-phase transformer 21 is correspondingly connected to the second single-phase supply line 15. The second output phase 24 and 25 of each of the two two-phase transformers 20 and 21 is in each case connected to the ground point 10. The balancing device 8 can therefore also be combined with two-phase transformers 20 and 21, which is particularly worthwhile for retrofitting. One or more identical transformers can be connected in parallel with the transformers 20 and 21, or in parallel with one of the two transformers 20 or 21.

Figure 4:
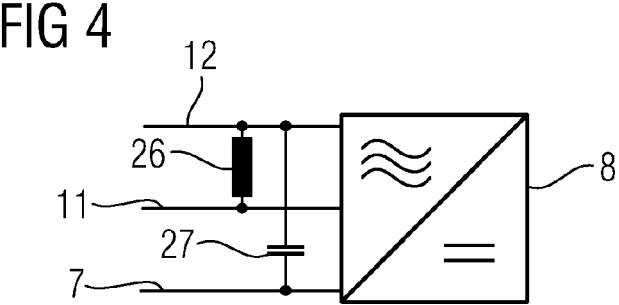
FIG. 4 shows a balancing device with additional means for reducing unbalances.

FIG. 4 shows a balancing device 8 which corresponds to the balancing devices 8 shown in the other figures and which is connected to an inductive load 26 and to a capacitive load 27 in order to prevent unbalances more cost-effectively. For this purpose, the inductive load 26 is connected between the second phase 11 and the third phase 12 of the balancing device 8, while the capacitive load 27 is connected between the first phase 7 and the third phase 12 of the balancing device 8. The device for connecting at least one single-phase supply line 4, 14, 15 to a three-phase power supply system 1 reduces or even corrects unbalances, which are undesirable according to the invention, in the power supply system currents and the power supply system voltage.

The invention claimed is:

1. A device for connecting a single-phase supply line to a three-phase power supply system, comprising:
   a single three-phase transformer having a primary side connected to the three-phase power supply system and a secondary side, said secondary side having a first phase, a second phase, and a third phase;
   a three-phase intermediate-circuit converter forming a balancing device connected between said transformer and the single-phase supply line;
   said secondary side of said transformer having a first phase connected to the single-phase supply line, a second phase connected to said balancing device, and a third phase connected to a ground connection;
   wherein the single-phase supply line is a sole single-phase supply line; and
   said balancing device having a first phase connected to said second phase of said transformer, a second phase connected to the single-phase supply line, and a third phase connected to the ground connection.

2. The device according to claim 1, wherein the single-phase supply line is disposed to feed an overhead line of a railroad track.

3. The device according to claim 1, which comprises an inductive load and a capacitive load connected on an input side of said balancing device.

4. The device according to claim 3, wherein said balancing device has three phases, said inductive load is connected between a second phase and a third phase of said balancing device, and said capacitive load is connected between the first phase and a third phase of said balancing device.

5. A device for connecting a single-phase supply line to a three-phase power supply system, comprising:
   wherein the single-phase supply line is a first single-phase supply line and a second single-phase supply line and the first and second single-phase supply lines are insulated from one another by an isolation point;
   at least one three-phase transformer having a primary side connected to the three-phase power supply system and a secondary side with three output phases respectively connected to the first single-phase supply line, to the second single-phase supply line, and to a ground connection;

a balancing device having a first phase connected to the first single-phase supply line, a second phase connected to the second single-phase supply line, and a third phase connected to the ground connection.

6. The device according to claim 5, wherein the single-phase supply line is disposed to feed an overhead line of a railroad track.

7. The device according to claim 5, wherein said transformer is a single transformer with the three phases.

8. The device according to claim 5, wherein said transformer is one of at least two transformers connected in parallel and each having three phases.

9. The device according to claim 5, which comprises an inductive load and a capacitive load connected on an input side of said balancing device.

10. The device according to claim 9, wherein said balancing device has three phases, said inductive load is connected between a second phase and a third phase of said balancing device, and said capacitive load is connected between the first phase and a third phase of said balancing device.

11. A device for connecting a single-phase supply line to a three-phase power supply system, comprising:

first and second transformers each having a primary side connected to the three-phase power supply system and each having a secondary side with two phases;

wherein the single-phase supply line is a first single-phase supply line and a second single-phase supply line and the first and second single-phase supply lines are insulated from one another by an isolation point;

a first output phase of said first transformer being connected to the first single-phase supply line and a second output phase of said first transformer being connected to a ground connection;

a first output phase of said second transformer being connected to the second single-phase supply line and a second output phase of said second transformer being connected to the ground connection;

a balancing device having a first phase connected to the first single-phase supply line, a second phase connected to the second single-phase supply line, and a third phase connected to the ground connection.

\* \* \* \* \*